(12) United States Patent  
Tsukada

(10) Patent No.: US 7,016,075 B1  
(45) Date of Patent: Mar. 21, 2006

(54) APPARATUS AND METHOD FOR AUTOMATIC COLOR CORRECTION AND RECORDING MEDIUM STORING A CONTROL PROGRAM THEREFOR

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 849 days.

(21) Appl. No.: 09/666,801

(22) Filed: Sep. 21, 2000

(30) Foreign Application Priority Data

Sep. 22, 1999 (JP) ................................ 11/267937

(51) Int. Cl.
G06K 15/00 (2006.01)
G06K 9/00 (2006.01)
H04N 1/46 (2006.01)

(52) U.S. Cl. ..................... 358/1.9; 358/2.1; 358/520; 358/518; 358/522; 382/167; 382/170

(58) Field of Classification Search ............... 358/1.9, 358/2.1, 500, 520, 518, 522, 527; 382/162, 382/167, 170
See application file for complete search history.

(56) References Cited

U.S. PATENT DOCUMENTS

| 4,386,267 A | 5/1983 | Yamada | |
|---|---|---|---|
| 5,317,648 A * | 5/1994 | Sawada et al. | 382/162 |
| 6,701,011 B1 * | 3/2004 | Nakajima | 382/167 |
| 2001/0012110 A1 * | 8/2001 | Kanamori | 358/1.9 |

FOREIGN PATENT DOCUMENTS

| GB | 2 304 484 A | 3/1997 |
|---|---|---|
| JP | 2-220566 | 9/1990 |
| JP | 3-229572 | 10/1991 |
| JP | 6-121159 | 4/1994 |
| JP | 6-133329 | 5/1994 |
| JP | 6-309433 | 11/1994 |
| JP | 8-79549 | 3/1996 |
| JP | 10-198795 | 7/1998 |
| JP | 11-17969 | 1/1999 |

* cited by examiner

Primary Examiner—Jerome Grant, II
(74) Attorney, Agent, or Firm—Sughrue Mion, PLLC

(57) ABSTRACT

In a color correction apparatus 1, a representative color extracting unit 13 reads from an object color information memory 12 a hue distributable region of an object selected by an object selecting unit 11 and the distribution frequency in each split hue region to extract a representative color. A color correction parameter determining unit 15 determines from the memory content of a color correction parameter memory 14 optimum color correction parameters adapted to the representative color extracted by the representative color extracting unit 13. A color correction processing unit 16 carries out, upon an input image, color correction acting only upon the representative color of the object and neighborhood colors therearound.

14 Claims, 14 Drawing Sheets

HUE A     HUE DISTRIBUTABLE RANGE     HUE B

FIG. 5

SELECTION OF OBJECT FOR COLOR CORRECTION

[✓] SKIN COLOR

[ ] GREEN VEGETATION

[ ] BLUE SKY        [SELECTION OK]

FIG. 6

| OBJECT A | | | |
|---|---|---|---|
| SPLIT REGION NO. | LOWER LIMIT HUE | UPPER LIMIT HUE | FREQUENCY |
| SPLIT REGION 1 | HUE 1 | HUE 2 | 0.01 |
| SPLIT REGION 2 | HUE 2 | HUE 3 | 0.02 |
| SPLIT REGION 3 | HUE 3 | HUE 4 | 0.03 |
| ⋮ | ⋮ | ⋮ | ⋮ |
| SPLIT REGION N | HUE N | HUE N+1 | 0.01 |

FIG. 7

| OBJECT A | | | | |
|---|---|---|---|---|
| SPLIT REGION NO. | PARAMETER | | | |
| | 1 | 2 | 3 | 4 |
| SPLIT REGION 1 | P1 | Q1 | R1 | S1 |
| SPLIT REGION 2 | P2 | Q2 | R2 | S2 |
| SPLIT REGION 3 | P3 | Q3 | R3 | S3 |
| ⋮ | ⋮ | ⋮ | ⋮ | ⋮ |
| SPLIT REGION N | PN | QN | RN | SN |

FIG. 8

START

S1: REPRESENTATIVE COLOR OF SPECIFIC OBJECT IS EXTRACTED FROM GIVEN INPUT IMAGE

S2: WITH REFERENCE TO COLOR CORRECTION PARAMETERS PRELIMINARILY ASSIGNED TO SPLIT COLOR REGIONS OBTAINED BY SPLITTING HUE DISTRIBUTABLE REGION OF SPECIFIC OBJECT, OPTIMUM COLOR CORRECTION PARAMETER ADAPTED TO EXTRACTED REPRESENTATIVE COLOR IS DETERMINED

S3: COLOR CORRECTION CONVERSION ACTING UPON SPECIFIC COLOR IS CARRIED OUT BY THE USE OF OPTIMUM COLOR CORRECTION PARAMETER

START

FIG. 10

| OBJECT A | | | | | | |
|---|---|---|---|---|---|---|
| SPLIT BY HUE | | SPLIT BY SATURATION | | SPLIT BY BRIGHTNESS | | |
| LOWER LIMIT | UPPER LIMIT | LOWER LIMIT | UPPER LIMIT | LOWER LIMIT | UPPER LIMIT | |
| HUE 1 | HUE 2 | SATURATION 1 | SATURATION 2 | BRIGHTNESS 1 | BRIGHTNESS 2 | |
| HUE 2 | HUE 3 | SATURATION 2 | SATURATION 3 | BRIGHTNESS 2 | BRIGHTNESS 3 | |
| ⋮ | ⋮ | ⋮ | ⋮ | ⋮ | ⋮ | |
| HUE N | HUE N+1 | SATURATION M | SATURATION M+1 | BRIGHTNESS L | BRIGHTNESS L+1 | |
| SPLIT REGION NO. | FREQUENCY | | | | | |
| SPLIT REGION 1 | 0.01 | | | | | |
| SPLIT REGION 2 | 0.02 | | | | | |
| ⋮ | ⋮ | | | | | |
| SPLIT REGION NxMxL | 0.01 | | | | | |

SPLIT INFORMATION SECTION

SPLIT INFORMATION SECTION

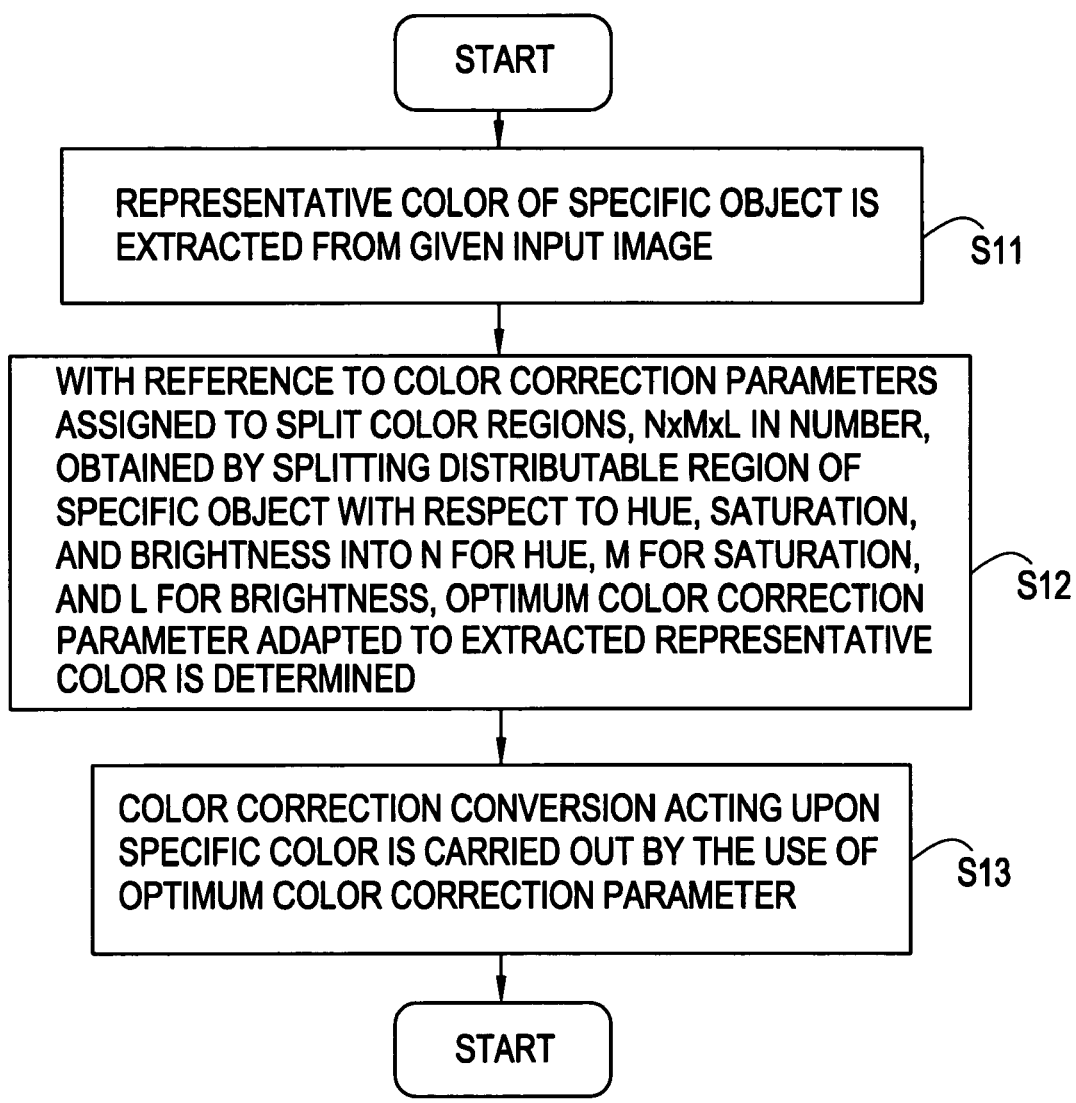

FIG. 15

INPUT APPARATUS

☐ APPARATUS A  ☐ APPARATUS B  ☑ APPARATUS C

☐ APPARATUS A  ☑ APPARATUS B  ☐ APPARATUS C

SELECTION OK

APPARATUS AND METHOD FOR AUTOMATIC COLOR CORRECTION AND RECORDING MEDIUM STORING A CONTROL PROGRAM THEREFOR

BACKGROUND OF THE INVENTION

This invention relates to an apparatus and a method for automatic color correction and a recording medium storing a control program therefor and, in particular, to a color correction technique for a color image in a color image processing apparatus, such as a digital still camera, a scanner, a display, and a printer, and in color image processing software.

In color reproduction of a color image, it is important to realize not only exact color reproduction among color image processing apparatuses but also favorable color reproduction favorable to human beings. Natural matters such as the flesh or skin color, the blue sky, and the green vegetation tend to attract attention of human beings and therefore require favorable color reproduction.

Particularly for the skin color, proposal has been made of various skin color correction techniques. For example, Japanese Unexamined Patent Publication (JP-A) No. H08-79549 discloses the technique of improving the reproducibility of the skin color. In the disclosed technique, a high frequency component of a spatial frequency is eliminated for a skin color region to lessen the granular texture and to prevent gradation or color missing at a highlighted portion.

Japanese Unexamined Patent Publication (JP-A) No. H11-17969 discloses the technique of correcting an unfavorable skin color deviated from a favorable skincolor range into a favorable skin color. In this technique, an input image is displayed on a color CRT (Cathode Ray Tube). As an object color to be corrected, the unfavorable skin color such as a darkened skin color or a greenish skin color is selected by a pointing device. The hue of a target picture element corresponding to the object color and the hue of the neighborhood are converted into a desired hue.

Japanese Unexamined Patent Publication (JP-A) No. H06-133329 discloses the technique of correcting color deviation. Specifically, local color deviation is detected for a particular color category, not only the skin color, and converted into a representative color of the particular color category.

Japanese Unexamined Patent Publication (JP-A) No. H06-121159 discloses the color correction technique taking into account memory colors memorized by human beings for color categories such as the skin color, the sky, and the green vegetation.

On the other hand, Japanese Unexamined Patent Publication (JP-A) No. H10-1198795 discloses the color correction technique of arbitrarily selecting a specific hue as an object hue to be corrected and defining a characteristic degree representative of the distance between the specific hue and the hue of the target picture element so that the specific hue alone is subjected to color correction.

In the conventional color correction technique disclosed in JP-A H11-17969, a dialog with a user is executed by the use of a graphical user interface (GUI).

By the use of the technique, it is possible to manually select the representative color in an object area to be corrected and a color correction parameter. This allows flexible and excellent color correction. However, in order to process a large amount of image data in a short time, this technique is inappropriate. This is because the processing time and the labor required in the processing forms a bottleneck and the result of correction would fluctuate in dependence upon the skill of an operator.

In order to avoid the fluctuation of the result of correction due to the difference in skill of the operator and the bottleneck by the processing time, color correction of a color image must be automatically carried out without requiring the user's operation. In the above-mentioned technique disclosed in JP-A H06-133329, a designated hue region is detected and converted into a representative constant color. However, the color of the natural matter such as the skin color, the blue sky, or the green vegetation is not constant. Therefore, natural color reproduction can not be =achieved unless a resultant color after conversion is given a certain degree of fluctuation.

In the above-mentioned technique disclosed in JP-A H06-121159, a single predetermined parameter is used for each object, e.g., the natural matter such as the skin color, the blue sky, and the green vegetation. However, the natural matter such as the skin color, the blue sky, or the green vegetation has a wide color distribution under the influence of characteristics of various input apparatuses and various image pickup environments. For color correction of such object having a wide color distribution, it is necessary to more precisely select optimum correction parameters in dependence upon the hue, the saturation (shade), and the brightness (value) of the color of the object detected from an input image. Otherwise, excellent color reproduction is impossible.

In JP-A H10-198795, proposal is made of the manual color correction by use of the GUI to designate the object color and the automatic color correction exclusively for the skin color. In the automatic color correction, the skin color region is detected by the use of RGB threshold values or YCbCr threshold values. However, if this technique is applied to images picked up under various lighting environments or backgrounds, the accuracy in detection of the skin color region is insufficient as far as the RGB threshold values or the YCbCr threshold values alone are used.

In JP-A H06-121159, the object to be corrected is detected from the input image by the use of the information of an area of the object region determined from threshold values for the hue, the saturation, and the brightness, like in JP-A H10-198795. Such information is given as a simple histogram. However, due to the similar reason, the accuracy in detection of, for example, the skin color is insufficient.

SUMMARY OF THE INVENTION

It is therefore an object of this invention to provide an automatic color correction apparatus and an automatic color correction method capable of realizing excellent color correction for natural images picked up as input images under various lighting environments, even if the information as to the lighting environment of the input image, the sensitivity characteristic of an input sensor, and the like is unavailable.

According to this invention, there is provided an automatic color correction apparatus which is for carrying out color correction upon a specific object in a color image and which comprises an object color information memory for memorizing split hue regions obtained by splitting a hue distributable region of the specific object as well as a distribution frequency; representative color extracting means for extracting a representative color of the specific object from a given input image with reference to the memory content of the object color information memory; a color correction parameter memory for memorizing color correction parameters assigned to the split hue regions; color correction parameter determining means for determining from the memory content of the color correction parameter memory an optimum color correction parameter adapted to the representative color extracted by the representative color extracting means, and color correction processing means for carrying out color correction conversion acting only upon a specific hue by the use of the optimum color correction parameter determined by the color correction parameter determining means.

According to this invention, there is also provided an automatic color correction method which is for carrying out color correction upon a specific object in a color image and which comprises the steps of extracting a representative color of the specific object from a given input image, determining, with reference to the content of a color correction parameter memory for memorizing color correction parameters assigned to split hue regions obtained by splitting a hue distributable region of the specific object, an optimum color correction parameter adapted to the representative color extracted in the preceding step, and carrying out color correction conversion acting only upon a specific hue by the use of the optimum color correction parameter.

According to this invention, there is also provided a recording medium storing an automatic color correction control program for controlling an automatic color correction apparatus to carry out color correction upon a specific object in a color image. The automatic color correction control program controls the automatic color correction apparatus to make the automatic color correction apparatus carry out operations of extracting from a given input image a representative color of the specific object, assigning color correction parameters to split hue regions obtained by splitting a hue distributable region of the specific object, determining an optimum color correction parameter adapted to the representative color extracted as mentioned above, and carrying out color correction conversion acting only upon a specific hue by the use of the optimum color correction parameter.

Specifically, a first automatic color correction method according to this invention is for carrying out color correction upon a specific object in a color image and comprises the steps of extracting from a given input image a representative color of the specific object, assigning color correction parameters to split hue regions obtained by splitting a hue distributable region of the specific object, determining an optimum color correction parameter adapted to the representative color extracted as mentioned above, and carrying out color correction conversion acting only upon a specific hue by the use of the optimum color correction parameter.

In a second automatic color correction method according to this invention, the step of assigning the color correction parameters assigns the color correction parameters not only to the split hue regions of the specific object but also to a plurality of split saturation regions and a plurality of split brightness regions obtained by splitting a saturation distributable region and a brightness distributable region of the specific object, respectively.

In a third automatic color correction method according to this invention, the step of extracting the representative color extracts the representative color of the specific object by the use of the variance of coordinate positions in the image in addition to the distribution frequency related to a hue, a saturation, or a brightness of the specific object, or a combination thereof.

A first automatic color correction apparatus is for carrying out color correction of a specific object in a color image and comprises an object color information memory for memorizing split hue regions obtained by splitting a hue distributable region of the specific object as well as a distribution frequency; representative color extracting means for extracting a representative color of the specific object from a given input image; a color correction parameter memory for memorizing color correction parameters assigned to the split hue regions; color correction parameter determining means for determining from the color correction parameter memory an optimum color correction parameter adapted to the representative color extracted by the representative color extracting means, and color correction processing means for carrying out color correction conversion acting only upon a specific hue by the use of the optimum color correction parameter determined by the color correction parameter determining means.

A second automatic color correction apparatus according to this invention further comprises an extended object color information memory for memorizing split regions obtained by splitting a distributable range related to a hue, a saturation, or a brightness of the specific object or a combination thereof obtained by analyzing a plurality of images preliminarily picked up for the specific object under various image pickup environments as well as the distribution frequency. The representative color extracting means obtains a histogram of the hue, the saturation, or the brightness of the specific object in the input image or the combination thereof with reference to the split regions related to the hue, the saturation, the brightness, or a combination thereof, multiplies the distribution frequency by the histogram, and extracts as the representative color of the specific object a color present in a region having a maximum value as a result of multiplication.

In a third automatic color correction apparatus according to this invention, the representative color extracting means extracts the representative color of the specific object by the use of the variance of coordinate positions in the image in addition to the distribution frequency related to a hue, a saturation, or a brightness of the specific object or a combination thereof.

In a fourth automatic color correction apparatus according to this invention, the color correction parameter memory memorizes the color correction parameters assigned not only to the split hue regions of the specific object but also to split saturation regions and split brightness regions obtained by splitting a saturation distributable region and a brightness distributable region of the specific object, respectively.

A fifth automatic color correction apparatus according to this invention further comprises an input-dependent object color information memory for memorizing with respect to each individual input apparatus split regions obtained by splitting a distributable range related to a hue, a saturation, or a brightness of the specific object or a combination thereof as well as a distribution frequency, an output-dependent color correction parameter memory for holding the color correction parameter with respect to each individual output apparatus, and input/output apparatus selecting means for allowing a user to select the type of an input/output color image processing apparatus.

A sixth automatic color correction apparatus according to this invention further comprises a sample image memory for memorizing a plurality of kinds of sample color images of the specific object, manual color correction processing means for allowing a user to correct the color of the specific object, and color correction parameter generating means for generating the color correction parameters to be memorized in the color correction parameter memory with reference to the result of operation of the manual color correction processing means.

As described above, the representative color of the specific object such as the skin color, the blue sky, or the green vegetation in an image scene is extracted with high accuracy and the optimum color correction parameter for the representative color thus extracted is determined. In this manner, it is possible to automatically carry out excellent color correction upon a significant object (for example, the skin color, the blue sky, or the green vegetation) in each of natural images picked up under various lighting environments. In other words, it is possible to achieve excellent color correction upon each of natural images picked up under various lighting environments as an input image, even if the information as to the lighting environment of the input image, the sensitivity characteristic of an input sensor, and the like is unavailable.

BRIEF DESCRIPTION OF THE DRAWING

FIG. 5 shows an example of a GUI used in an object selecting unit illustrated in FIG. 4;

FIG. 6 shows an example of the content of an object color information memory illustrated in FIG. 4;

FIG. 7 shows an example of the content of a color correction parameter memory illustrated in FIG. 4;

FIG. 8 is a flow chart for describing an operation of the color correction apparatus illustrated in FIG. 4;

FIG. 10 shows an example of the content of an extended object color information memory illustrated in FIG. 9;

FIG. 11 is a flow chart for describing an operation of the color correction apparatus illustrated in FIG. 9;

FIG. 15 shows an example of a GUI used in an input/output apparatus selecting unit illustrated in FIG. 14;

DESCRIPTION OF THE PREFERRED EMBODIMENTS

Figure 1:
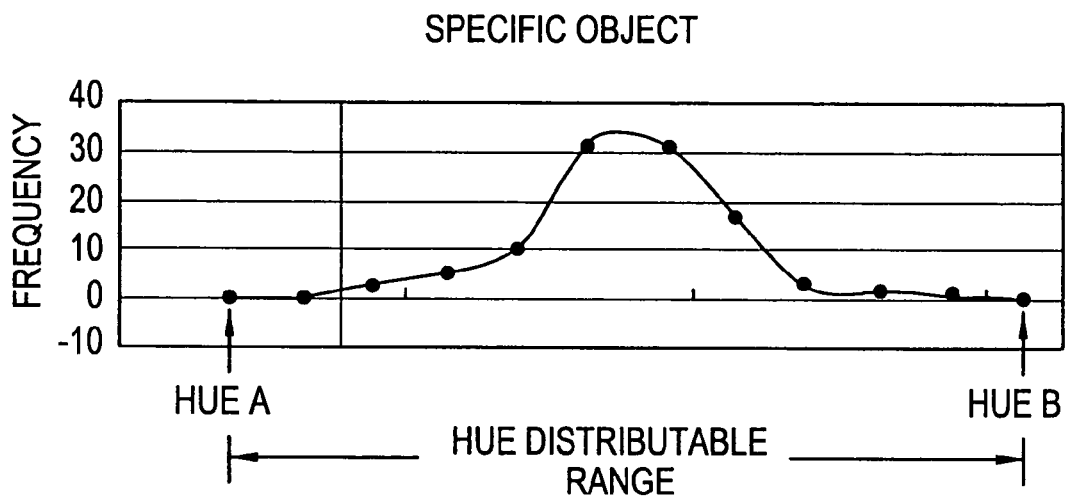
FIG. 1 is a graph showing a hue distributable region and a distribution frequency for an object.

Now, description will be made of several preferred embodiments of this invention with reference to the drawing. At first, an automatic color correction method according to this invention will be described. In order to realize automatic color correction upon a specific object in an input image, the automatic color correction method of this invention requires the steps of (1) extracting a representative color from a specific object region in the input image and (2) selecting an optimum color correction parameter corresponding to the representative color extracted as mentioned above.

In the step (1), the representative color of the specific object region is automatically extracted from any given input image. In this event, the input image contains an image which can not be identified for its source, i.e., an input apparatus such as a digital camera, a scanner, an image database on an internetwork, and so on. This means that the sensor characteristic of the input apparatus can not be identified. Therefore, it is difficult to estimate a lighting color and a substance color (or a body color) in an image scene as key factors of color correction.

In order to extract the representative color from the specific object region in each of various input images, preparation is preliminarily made of a distributable range and a distribution frequency for each of a hue, a saturation, and a brightness of a color obtained from the specific object region in each of image data of the specific object picked up in various lighting environments, on various backgrounds, and by various input apparatuses.

The distributable range and the distribution frequency related to the hue, the saturation, and the brightness of the color of the specific object region are similar to a recognition dictionary in pattern recognition. Preparation of the distributable range and the distribution frequency requires a manual operation. However, if once prepared, it is enough. Specifically, upon actually extracting the representative color of the specific object from the input image, use is made of the distributable range and the distribution frequency related to the hue, the saturation, the brightness of the specific object region. In this manner, the representative color of the specific object can be automatically extracted.

Referring to FIG. 1, a given specific object has a distributable range and the distribution frequency related to the hue. In the figure, a region between a lower limit hue A and an upper limit hue B is a hue range over which the specific object can be distributed, i.e., a hue distributable range. An ordinate represents the distribution frequency of the specific object in the distributable range. In FIG. 1, the distribution frequency and the distributable range are directed to the hue alone. However, the distribution frequency and the distributable range can also be prepared for a saturation component and a brightness component. Furthermore, it is possible to prepare the distributable range and the distribution frequency in a three-dimensional space of integration of three components, i.e., the hue, the saturation, and the brightness.

Figure 2:
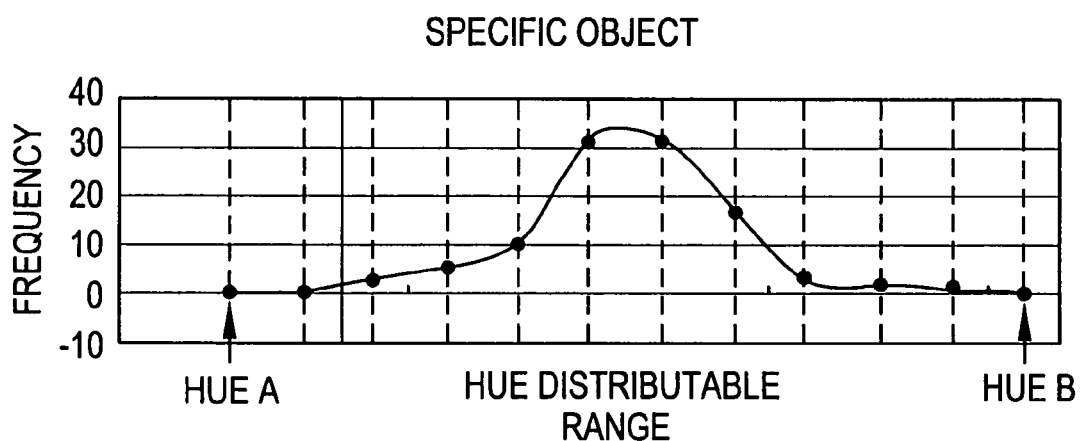
FIG. 2 is a graph showing the hue distributable region in FIG. 1 split into split regions.

Referring to FIG. 2, the hue distributable range in FIG. 1 is split into a plurality of regions, n in number, at a particular split interval. The split interval may be constant or variable. In the example illustrated in FIG. 2, the hue distributable range of the specific object is divided into eleven regions. In the following, those regions obtained by dividing the hue distributable range will be referred to as split hue regions.

Calculation is made of the distribution frequency $R_H(i)$ (i being an integer between 1 and n, both inclusive). The suffix H represents the hue. The distribution frequency $R_H(a)$ for a particular split hue region a is calculated by:

$$R_H(a) = b/\text{all}, \quad (1)$$

where b represents the number of samples present in the particular split hue region a and all represents the total number of samples. Similarly, calculation can also be made of the distribution frequency $R_S(i)$ for the saturation and the distribution frequency $R_V(k)$ for the brightness.

Next, description will be made of a technique of extracting a region containing the representative color of the specific object from the input image picked up under a given lighting environment. In this technique, use is made of the distributable range of the specific object and the distribution frequency in each of the split regions mentioned above. For simplicity, description will be directed to the hue.

Calculation is made of the hue, the saturation, and the brightness of each picture element of the input image. Herein, the hue, the saturation, and the brightness may be calculated as H (Hue), S (Shade), and V (Value) in the following equations widely used in color image processing, respectively, but are not restricted thereto. The shade and the value correspond to the saturation and the value, respectively.

$V = \text{Max}(R, G, B)$ when V=0 S=0 when V>0 $S=(V-\text{Min}(R, G, B))/V$ when S=0 H=0 when V=R $H=60(G-B)/SV$ when V=G $H=60(2+(B-R)/SV)$ when V=B $H=60(4+(R-G)/SV)$ when H<0 $H=H+360$ (2)

For each picture element, judgment is made about whether or not its hue falls within the hue distributable range of the specific object. If it is judged to fall within the range, detection is then made of one of the split hue regions, n in number, to which the hue belongs.

The above-mentioned operation is carried out for all of the picture elements contained in the input image to prepare a histogram $\text{HIT}_H(I)$ in each of all split hue regions. Herein, I is an integer between 1 and n, both inclusive, and represents an I-th region among the the split hue regions, n in number. Then, calculation is made of a representative color candidate index RP(i) in each split hue region as:

$RP(i) = \text{HIT}_H(i) \times R_H(i),$ (3)

where i is an integer between 1 and n, both inclusive.

In this case, one of the split hue regions which has a greatest value of the representative color candidate index RP is determined as a selected split hue region of the specific object in the input image. As the representative color of the specific object in the input image, use may be made of average RGB values of those picture elements present within the selected split hue region. Alternatively, each of the split hue regions may be preliminarily assigned with predetermined RGB values which would be used as the representative color. The predetermined RGB values may be obtained as average RGB values of those colors present in each split region by the use of the image data set used in obtaining the distributable range and the distribution frequency related to each of the hue, the saturation, and the brightness of the specific object.

The above-mentioned technique is a method of extracting the representative color of the specific object with reference to the color information alone. In order to further improve the accuracy in extracting the representative color, introduction is made of the variance of coordinate positions in the image with respect to the picture elements present in each split hue region. For example, it is assumed that the picture elements, K in number, are present within a split hue region a. Each of the picture elements has an XY coordinate (Xi, Yi) (i being an integer between 1 and K, both inclusive) in the image. For those picture elements, an average coordinate (Xc, Yc) is calculated by:

$Xc = \Sigma Xi/K$ and $Yc = \Sigma Yi/K,$ (4)

where $\Sigma$ represents the total sum for i=1 to K.

The variance Va of the coordinate positions of the picture elements present within the split hue region a Is given by:

$Va = \Sigma((Xc-Xi)^2 + (Yc-Yi)^2)/K,$ (5)

where $\Sigma$ represents the total sum for i=1 to K.

The difference between the variance Va and the standard variance SV of the specific object is introduced into the evaluation of the split hue region. The standard variance of the specific object can be calculated by the use of the image data set used in obtaining the distributable range and the distribution frequency related to each of the hue, the saturation, and the brightness of the specific object.

The evaluation of the split hue region may be carried out in various manners. For example, a threshold value is determined for the difference between the variance Va and the standard variance SV. If the difference in variance exceeds the threshold value, the region in question is discarded. Then, evaluation is carried out for the difference between the standard variance and the variance of another split hue region having a second greatest value of the representative color candidate index RP. Alternatively, definition is made of a modified representative color candidate index RP' given by:

$RP'(o) = \text{HIT}_H(o) \times R_H(o) \times C^{D(o)}$ (6)

where C is a real number constant in the range of 0<C<1 and D(o) is a real number in the range of D(o)≧0.0. In the modified representative color candidate index RP', an absolute value D(o) of the difference between the standard variance SV and the variance Vo of the specific object in a split hue region o is introduced. A particular split hue region having the maximum value of the modified representative color candidate index RP' is determined as a hue region which the specific object in the input image has.

The representative color is determined as an average of the colors present in the split hue region which is selected taking into account the variance of the coordinate positions of the specific object also.

Next, description will be made of the technique of selecting an optimum color correction parameter corresponding to the representative color extracted in the step (2). For a plurality of image data sets including the specific object, color correction is preliminarily carried out by manual operation so that the specific object has an excellent color. The color correction by the manual operation may be carried out by the color correction technique acting only on a specific hue as disclosed in JP-A H10-198795 and the technique utilizing the GUI.

Figure 3:
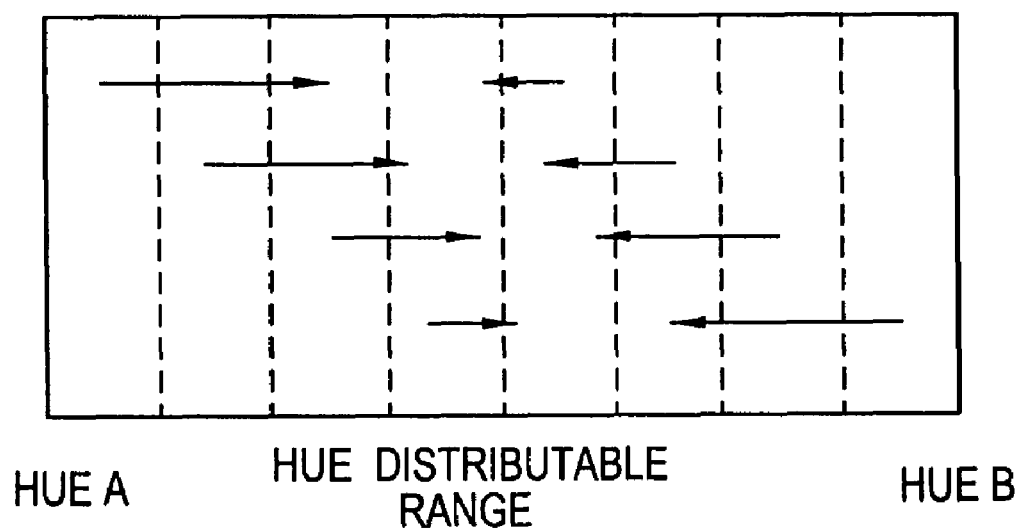
FIG. 3 is a graph showing the change in hue of the object before and after color correction.

Referring to FIG. 3, the variation in hue of the specific object before and after the color correction is averaged for each of the split hue regions. The start point and the end point of each arrow represent a hue before correction and a hue after correction, respectively.

The color correction parameter for generating the variation is described in a color correction parameter memory for each of the split hue regions. Thereafter, calculation is made of the hue of the representative color of the specific object extracted from the input image. The color correction parameter assigned to the split hue region where the hue is present is read from the color correction parameter memory to be determined.

The foregoing description is directed to the color correction technique with reference to the hue alone, it will readily be understood that the color correction with high accuracy can be achieved by incorporating the information of the saturation and the brightness by the use of the similar technique.

Figure 4:
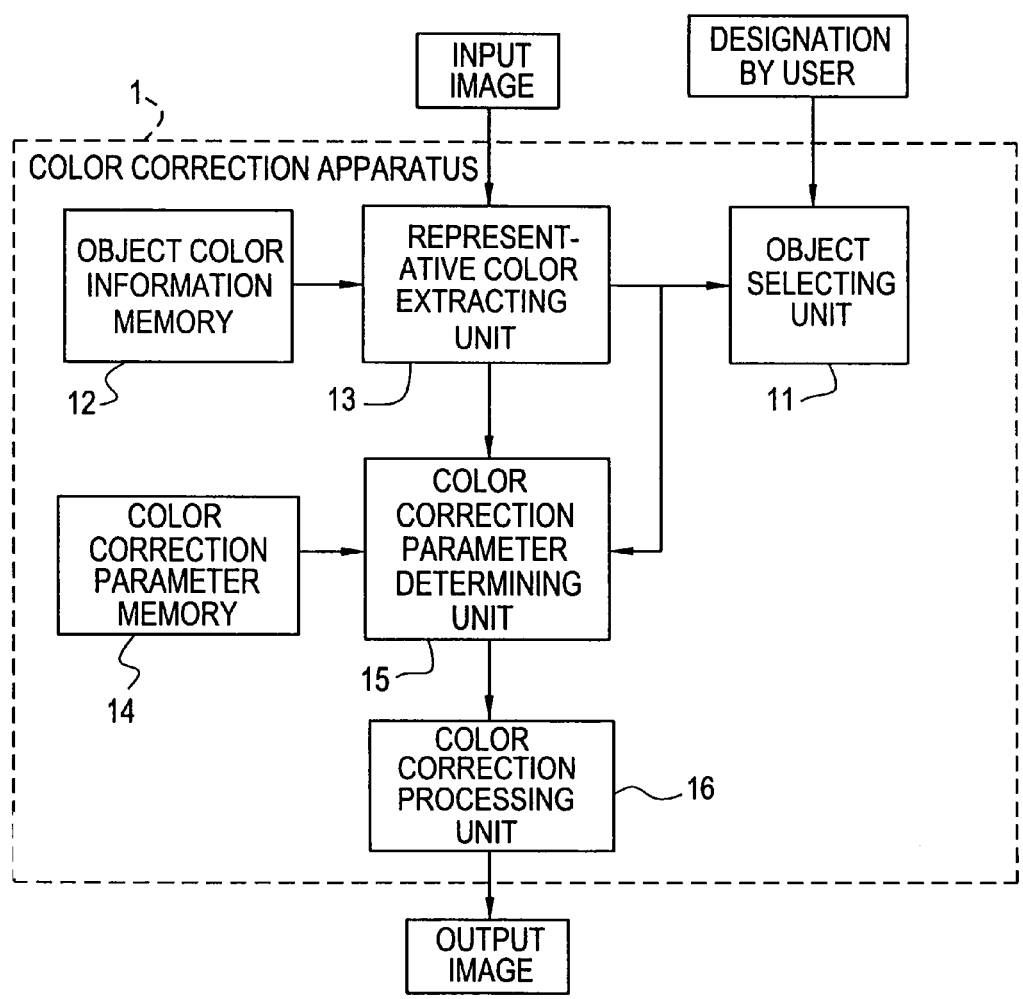
FIG. 4 is a block diagram of a color correction apparatus according to a first embodiment of this invention.

Referring to FIG. 4, a color correction apparatus according to a first embodiment of this invention comprises an object selecting unit 11 for selecting an object to be subjected to color correction, an object color information memory 12 for memorizing the distributable region and the distribution frequency with respect to the hue for each specific object preliminarily assumed, a representative color extracting unit 13 for extracting the representative color of the specific object from the input image, a color correction parameter memory 14 for memorizing color correction parameters, a color correction parameter determining unit 15 for determining from the content of the color correction parameter memory 14 an optimum color correction parameter corresponding to the representative color extracted from the input image by the representative color extracting unit 13, and a color correction processing unit 16 for carrying out color correction exclusively upon the representative color extracted as mentioned above and neighborhood colors therearound.

Referring to FIGS. 4 through 8, description will be made of the structure and the operation of the color correction apparatus 1. The operation illustrated in FIG. 8 is achieved when each component of the color correction apparatus 1 executes a program stored in a control memory (not shown). The control memory may comprise a ROM (Read Only Memory), an IC (Integrated Circuit) memory, or the like.

The object selecting unit 11 has a function of allowing a user to easily select the object to be subjected to color correction. Referring to FIG. 5, the object selecting unit 11 uses a GUI inviting the selection among three options, i.e., the skin color, the green vegetation, and the blue sky, as the object of color correction.

The object selecting unit 11 may be arranged so that a plurality of objects can be selected, provided that the distributable regions of the respective objects in a color space are not overlapped. In FIG. 5, the skin color is selected.

The representative color extracting unit 13 at first reads from the object color information memory 12 the distributable region of the hue of the object selected by the object selecting unit 11 and the distribution frequency in the split hue region.

In the object color information memory 12, the information about a plurality of objects A, B, and C is described. Referring to FIG. 5, the information about the object A includes a split hue region number, upper and lower limit values of the hue for designating each split hue region, and the frequency with respect to the object A. Although not illustrated in the figure, the object color information memory 12 includes the description of the information of the objects B and C, similar to that of the object A.

The representative color extracting unit 13 calculates the hue for each of all picture elements of the input image, prepares the histogram for each split hue region, calculates the representative color candidate index RP in each split hue region by the use of Equation (3), and selects a particular split hue region having the maximum value as a region occupied by the object A in the input image. Furthermore, the representative color extracting unit 13 determines, as the representative color of the object A in the input image, the average RGB value of the colors present in the split hue region in question (step S1 in FIG. 8).

The color correction parameter determining unit 15 determines from the memory content of the color correction parameter memory 14 the optimum color correction parameter corresponding to the representative color extracted by the representative color extracting unit 13. Specifically, with reference to the memory content of the color correction parameter memory 14 memorizing the color correction parameters assigned to the split hue regions obtained by splitting the hue distributable region of the specific object, the color correction parameter determining unit 15 determines the optimum color correction parameter corresponding to the representative color extracted by the representative color extracting unit 13 (step S2 in FIG. 8).

The color correction parameter memory 14 memorizes the color correction parameters for the objects A, B, and C. Referring to FIG. 7, the description of the color correction parameters about the object A alone is illustrated. Although not shown in the figure, the content similar to the object A is also described in the color correction parameter memory 14 for each of the objects B and C. For example, it is assumed that the representative color extracting unit 13 determines that the hue of the object A is a split hue region #2. Then, the color correction parameters (P2, Q2, R2, S2) are determined.

The color correction processing unit 16 carries out, upon the input image, the color correction only for the representative color of the object and the neighborhood colors therearound. Specifically, the color correction processing unit 16 carries out color correction conversion acting on the specific color by the use of the optimum color correction parameter (step S3 in FIG. 8).

The above-mentioned color correction may be carried out by the color correction technique disclosed, for example, in JP-A HI 0-198795. If the color correction technique disclosed in JP-A H10-198795 is used, the color correction for the input RGB is represented by:

$$(R', G', B')=(R, G, B)+hx\times(a1, a2, a3), \quad (7)$$

where (R, G, B) is a set of given RGB values in the input image, (R', G', B') is a set of RGB values after correction, (a1, a2, a3) is a set of an R correction amount, a G correction amount, and a B correction amount, and hx represents as a characteristic degree the distance between a center color (Rc, Gc, Bc) of correction and the given RGB values (R, G, B).

The distance hx is given by:

$$hx=[pos(m-|Hue-hI|)/m]\times sI\times vI, \quad (8)$$

where pos(x)=0 when x<0 and pos(x)=x when x≧0, m represents an allowable hue angle, Hue is a Hue value of HSV values (Hue, Sat, Val) calculated from the RGB values of the object to be corrected, and hI, sI, vI are HSV values of the given RGB values.

The representative color extracted by the representative color extracting unit 13 is used as a center color of color correction. The color correction parameters (P2, Q2, R2, S2) determined by the color correction parameter determining unit 15 represent the R correction amount the G correction amount, the B correction amount, and the allowable hue angle, respectively.

The foregoing is directed to the color correction apparatus 1 addressed to the hue alone. It will be understood that an improved color correction apparatus of high accuracy can be achieved by extending the object color information memory 12 of the color correction apparatus 1 to incorporate saturation and brightness components in addition to the hue.

Figure 9:
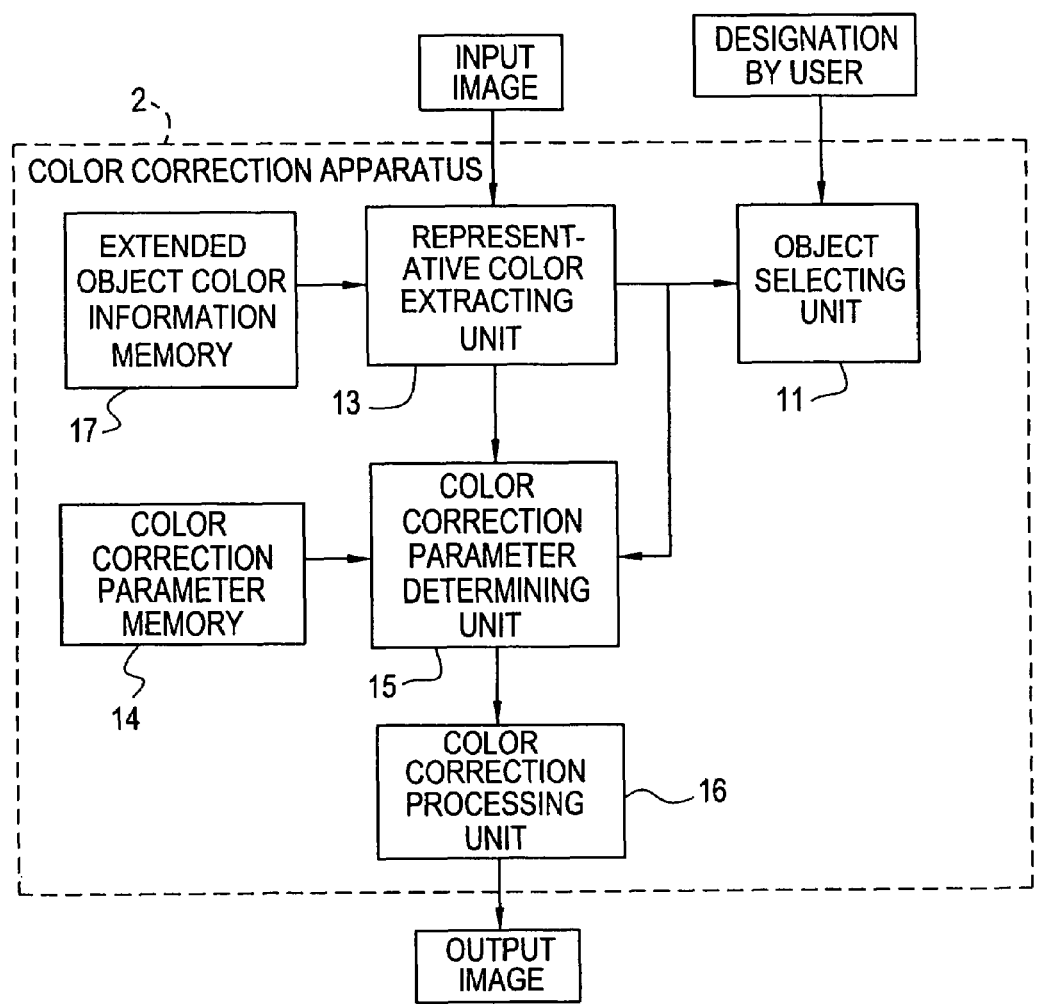
FIG. 9 is a block diagram of a color correction apparatus according to a second embodiment of this invention.

Referring to FIG. 9, a color correction apparatus 2 according to a second embodiment of this invention is similar in structure to the color correction apparatus 1 in FIG. 4 according to the first embodiment except that the object color information memory 12 is replaced by an extended object color information memory 17. Similar parts are designated by like reference numerals and perform similar operations. Specifically, the color correction apparatus 2 takes into account not only the hue but also the saturation and the brightness components.

Referring to FIG. 10, the extended object color information memory 17 comprises a split information section and a frequency information section. The split information section includes the description of upper and lower limit values for each of the hue, the saturation, and the brightness components in order to split the distributable region of the object. The frequency information section includes he description of the frequency in each split region.

In FIG. 10, the description about the object A alone in the extended object color information memory 17 is illustrated. However, the extended object color information memory 17 includes the similar description for each of the objects B and C. In FIG. 10, the distributable region of the object A is split into N for the hue, M for the saturation, and L for the brightness. Thus, the total number of the split regions is equal to N×M×L.

Referring to FIG. 11 in addition to FIGS. 9 and 10, the operation of the color correction apparatus 2 according to the second embodiment will be described. The operation illustrated in FIG. 11 is achieved when each component of the color correction apparatus 2 executes a program stored in a control memory (not shown). The control memory may comprise a ROM, an IC memory, or the like.

In the manner similar to that described in conjunction with the color correction apparatus 1, the representative color extracting unit 13 prepares the histogram for each split region split by the hue, the saturation, and the brightness, calculates the representative color candidate index RP in each split region, and selects a particular split region having the maximum value as a split region which the object has. Furthermore, the representative color extracting unit 13 determines, as the representative color of the object in the input image, the average RGB values of the colors present in the split hue region (step S11 in FIG. 11).

The color correction parameter determining unit 15 determines from the memory content of the color correction parameter memory 14 the optimum color correction parameters corresponding to the representative color extracted by the representative color extracting unit 13. Specifically, with reference to the memory content of the color correction parameter memory 14 memorizing the color correction parameters assigned to the split regions, N×M×L in total, obtained by splitting the distributable region of the specific object related to the hue, the saturation, and the brightness into N for the hue, M for the saturation, and L for the brightness, the color correction parameter determining unit 15 determines the optimum color correction parameters corresponding to the representative color extracted by the representative color extracting unit 13 (step S12 in FIG. 11).

The color correction processing unit 16 carries out, upon the input image, the color correction only for the representative color of the object and the neighborhood colors therearound. Specifically, the color correction processing unit 16 carries out color correction conversion acting only upon the specific hue by the use of the optimum color correction parameters (step S13 in FIG. 11). The color correction parameter memory 14 in the color correction apparatus 2 holds the color correction parameters for the split regions equal in number to N×M×L.

Figure 12:
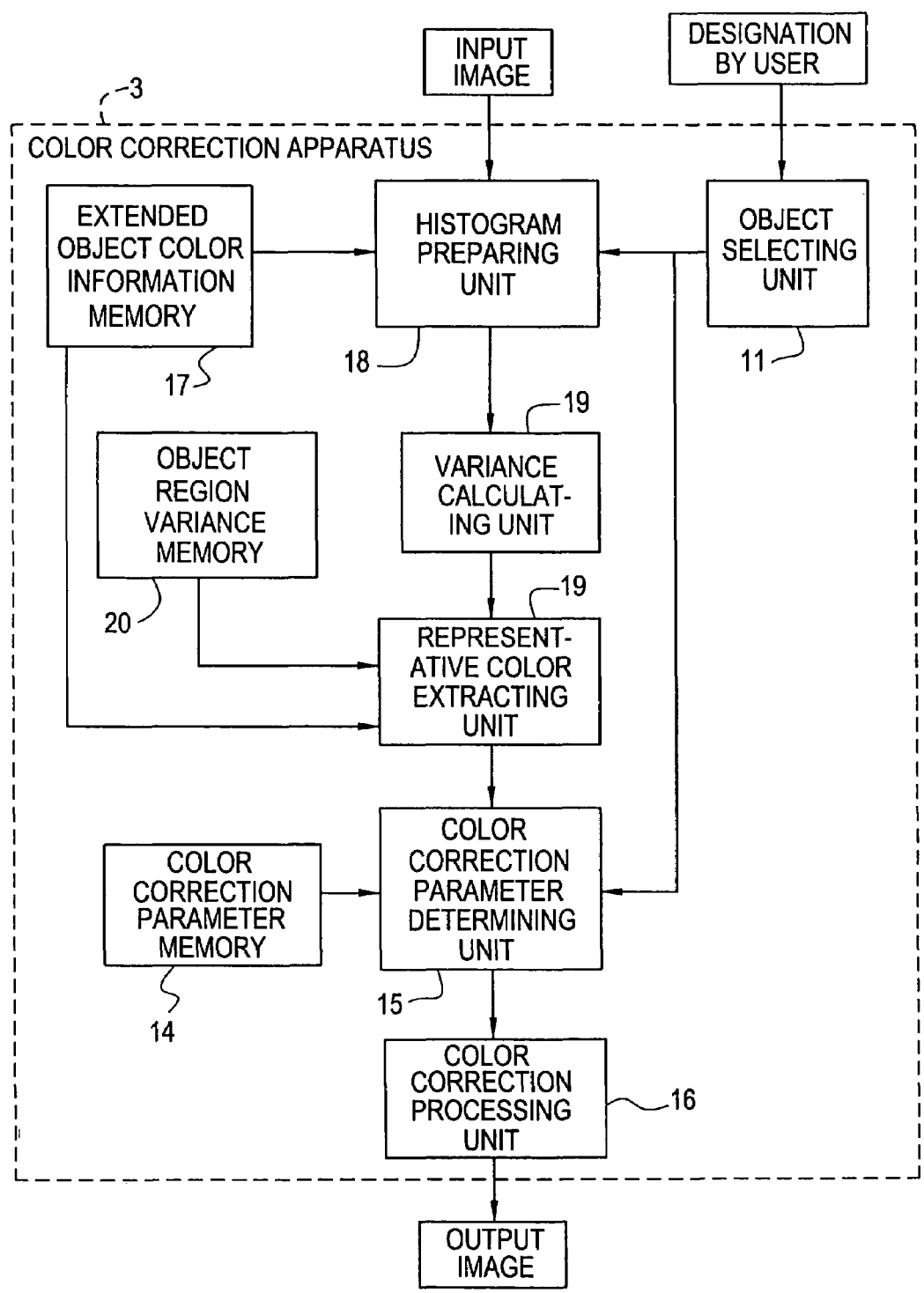
FIG. 12 is a block diagram of a color correction apparatus according to a third embodiment of this invention.

Referring to FIG. 12, a color correction apparatus 3 according to a third embodiment of this invention is similar in structure to the color correction apparatus 2 in FIG. 9 according to the second embodiment except that the representative color extracting unit 13 is replaced by a histogram preparing unit 18, a variance calculating unit 19, an object region variance memory 20, and a representative color determining unit 21. Similar parts are designated by like reference numerals and perform similar operations. Thus, upon extracting the representative color of the object from the input image, the color correction apparatus 3 takes into account not only the color information of the object but also the variance of coordinate positions on the image.

Figure 13:
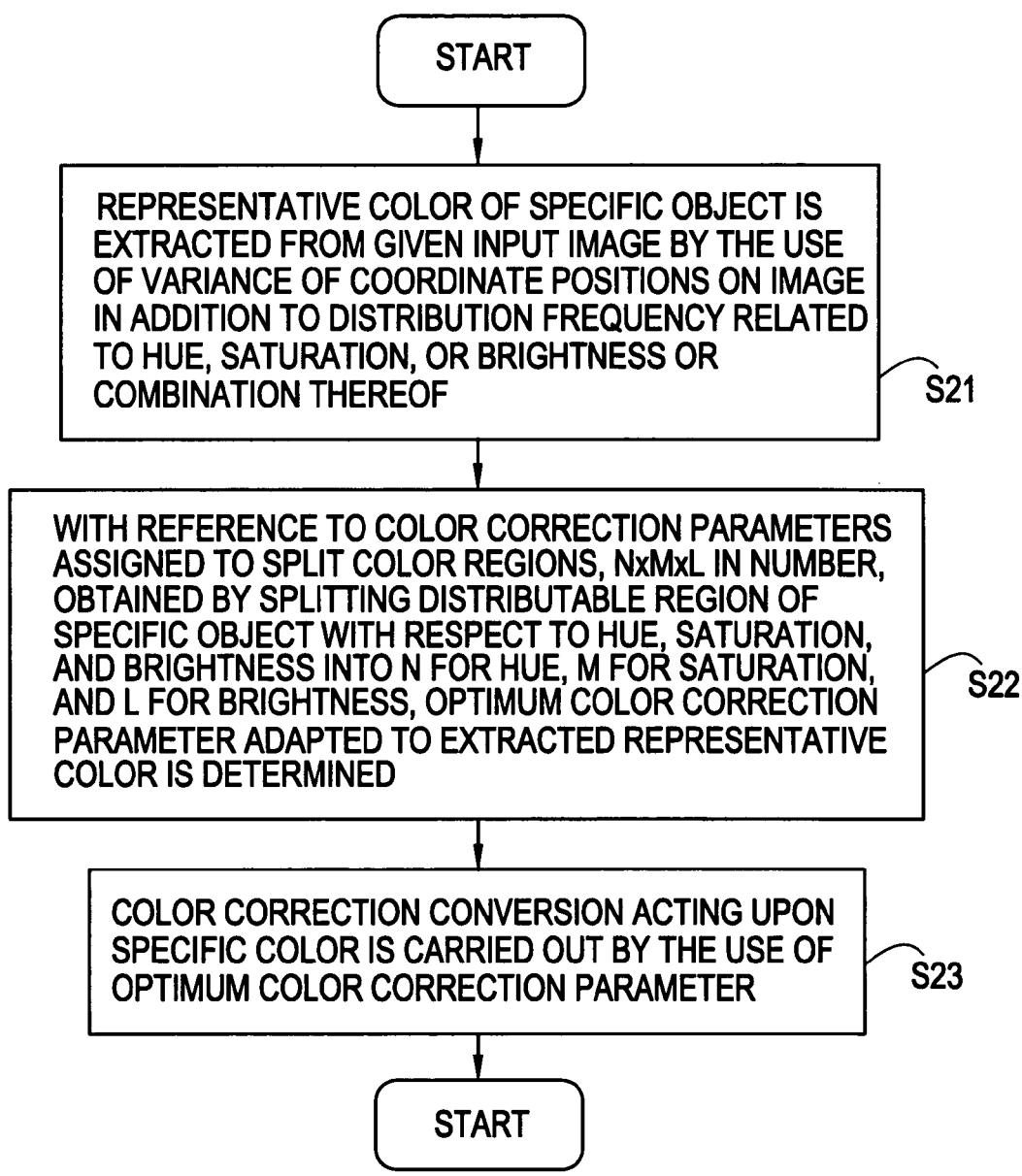
FIG. 13 is a flow chart for describing an operation of the color correction apparatus illustrated in FIG. 12.

Referring to FIG. 13 in addition to FIG. 12, the operation of the color correction apparatus 3 according to the third embodiment will be described. The operation illustrated in FIG. 13 is realized when each component of the color correction apparatus 3 executes a program stored in a control memory (not shown). The control memory may comprise a ROM, an IC memory, or the like.

At first, the histogram preparing unit 18 prepares a histogram in each split region of the object designated by the extended object color information memory 17 and memorizes image coordinates of those colors hitting the split region. The variance calculating unit 19 calculates an average coordinate position in each split region by the use of Equation (4) and calculates the variance of coordinate positions in each split region by the use of Equation (5).

Next, in order to calculate the modified representative color candidate index RP', the representative color determining unit 21 reads the standard variance of the object from the object region variance memory 20, calculates the difference between the standard variance and the variance of the coordinate positions in each split region, and calculates the modified representative color candidate index RP' in each split region by the use of Equation (6). A particular split region having the maximum value is selected as a hue region occupied by the specific object in the input image. In the manner similar to that carried out by the representative color extracting unit 13, the representative color determining unit 21 determines as the representative color the average RGB values of the colors present in the particular split region selected as mentioned above (step S21 in FIG. 13).

The color correction parameter determining unit 15 determines from the memory content of he color correction parameter memory 14 the optimum color correction parameters corresponding to the representative color extracted by the representative color extracting unit 13. Specifically, with reference to the memory content of the color correction parameter memory 14 memorizing the color correction parameters assigned to the split regions, N×M×L in total, obtained by splitting the distributable region of the specific object related to the hue, the saturation, and the brightness into N for the hue, M for the saturation, and L for the brightness, the color correction parameter determining unit 15 determines the optimum color correction parameters corresponding to the representative color extracted by the representative color extracting unit 13 (step S22 in FIG. 13).

The color correction processing unit 16 carries out, upon the input image, the color correction only for the representative color of the object and the neighborhood colors therearound. Specifically, the color correction processing unit 16 carries out color correction conversion acting only upon the specific hue by the use of the optimum color correction parameters (step S23 in FIG. 13).

Figure 14:
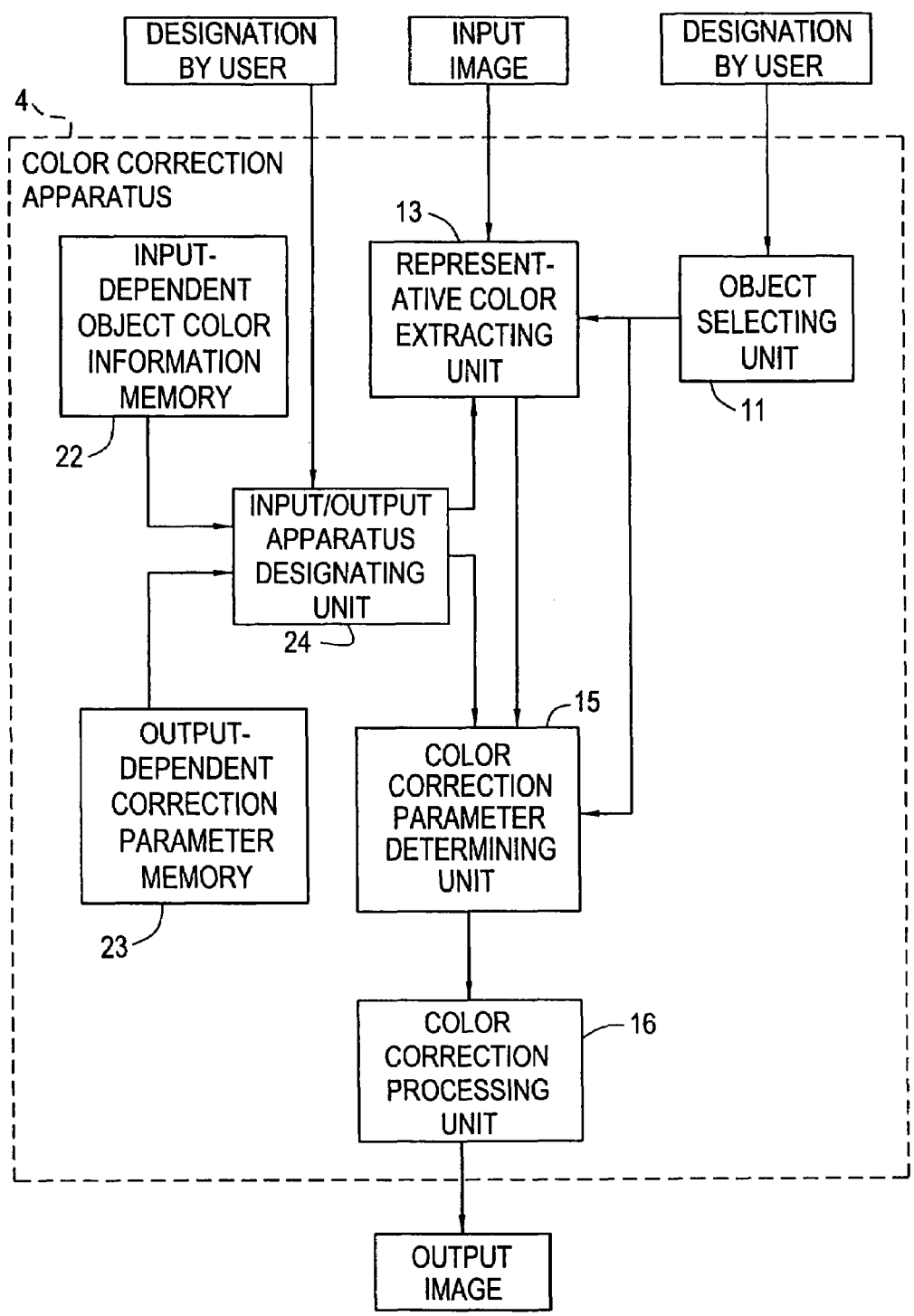
FIG. 14 is a block diagram of a color correction apparatus according to a fourth embodiment of this invention.

Referring to FIG. 14, a color correction apparatus 4 according to a fourth embodiment of this invention comprises an object selecting unit 11, a representative color extracting unit 13, a color correction parameter determining unit 15, a color correction processing unit 16, an input-dependent object color information memory 22, an output-dependent correction parameter memory 23, and an input/output apparatus designating unit 24.

Generally, color image input/output apparatuses are different in color characteristic from one another. If it is known that the input image is acquired by an input apparatus preliminarily assumed, the distribution region of the object can be restricted to some extent. In case where an output apparatus for an output image after color correction can be identified, color correction can further be improved by preparing the color correction parameters such that the color correction into the optimum color is achieved for the output image produced by the output apparatus as identified.

Referring to FIG. 15, the input/output apparatus designating unit 24 uses a GUI illustrated in the figure to provide a function of allowing a user to select an input apparatus or an output apparatus. The GUI illustrated in FIG. 15 allows the selection of three kinds of input apparatuses A, B, and C and three kinds of output apparatuses D, E, and F. As far as the input and the output apparatuses can be selected, any other appropriate arrangement is bapplicable.

The input-dependent object color information memory 22 memorizes the distributable region of the object and the distribution frequency as illustrated in FIG. 6 or 10 for each kind of the models A, B, and C as the input apparatuses assumed by the color correction apparatus.

The input/output apparatus designating unit 24 reads from the input-dependent object color information memory 22 the distributable region of the object and the distribution frequency corresponding to the selected input apparatus and delivers the distributable region of the object and the distribution frequency to the representative color extracting unit 13. The representative color extracting unit 13 extracts the representative color with reference thereto.

The output-dependent color correction parameter memory 23 memorizes the color correction parameters illustrated in FIG. 7 for each split region of the object with respect to each of the output apparatuses D, E, and F assumed by the color correction apparatus.

The input/output apparatus designating unit 24 reads from the output-dependent color correction parameter memory 23 the color correction parameters of the object corresponding to the output apparatus designated by the user and sends the color correction parameters of the object to the color correction parameter determining unit 15. From the color correction parameters delivered from the input/output apparatus designating unit 24, the color correction parameter determining unit 15 determines the optimum color correction parameters adapted to the representative color extracted by the representative color extracting unit 13. In the above-mentioned manner, the color correction apparatus 4 realizes color correction of high accuracy in case where the input/output apparatus can be identified.

Figure 16:
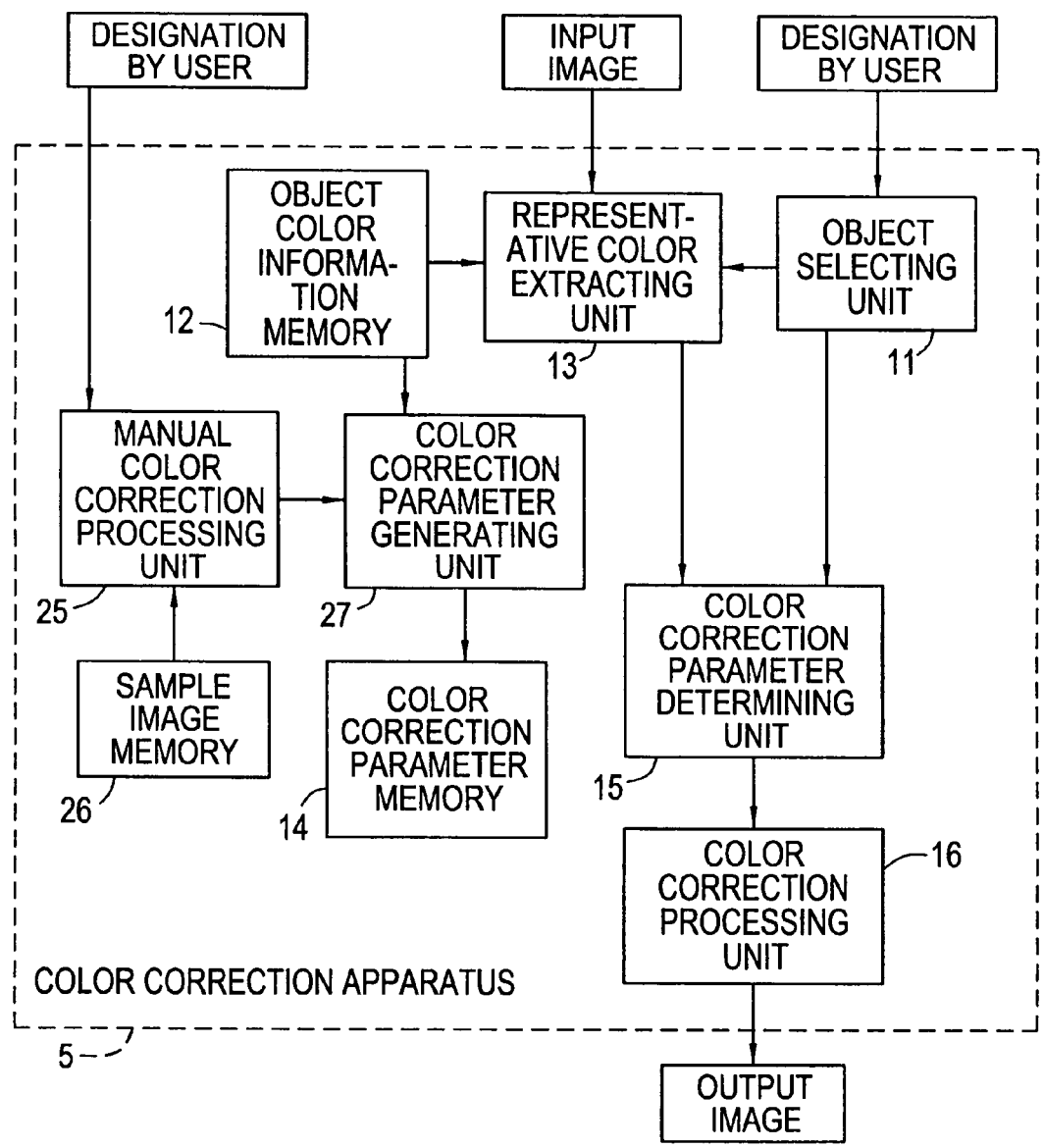
FIG. 16 is a block diagram of a color correction apparatus according to a fifth embodiment of this invention.

Referring to FIG. 16, a color correction apparatus 5 according to a fifth embodiment of this invention is similar in structure to the color correction apparatus 1 in FIG. 4 according to the first embodiment except that a manual color correction processing unit 25, a sample image memory 26, and a color correction parameter generating unit 27. Similar parts are designated by like reference numerals and perform similar operations.

Generally, for the specific object such as the skin color, the green vegetation, or the blue sky in a color image, a favorable color or a desired color is present. However, the favorable color for each object is some or less different in dependence upon the taste of the user. Therefore, the color correction apparatus 5 according to the fifth embodiment further comprises the manual color correction processing unit 25, the sample image memory 26, and the color correction parameter generating unit 27 in order to meet the demand of each user in addition to the structure of the color correction apparatus 1.

The manual color correction processing unit 25 has a color correction algorithm similar to that of the color correction processing unit 16 but the color correction parameters are given by the user. Herein, the sample image memory 26 memorizes a plurality of sample images of the assumed object so that the color of the object is widely distributed.

The manual color correction processing unit 25 displays the sample images of the object supplied from the sample image memory 26 and provides the GUI for the user to execute color correction of the object.

Figure 17:
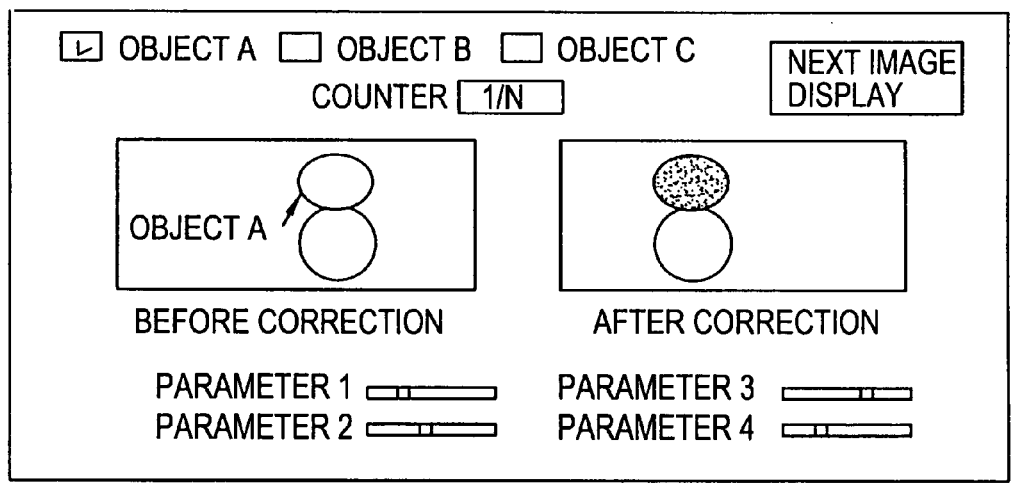
FIG. 17 shows an example of a GUI used in a manual color correction processing unit illustrated in FIG. 16.

Referring to FIG. 17, the manual color correction processing unit 25 in FIG. 16 provides the GUI in which the object A is selected as the object to be corrected. The counter shows that a first image of the sample images, N in number, is displayed.

At the center of the GUI, the images before and after correction are displayed. In the image before color correction, it is shown that only the object A depicted by an arrow is subjected to color correction. The representative color of the object A in the sample image is designated by the user with a pointing device such as a mouse. The user adjusts the color correction parameters 1 through 4 until he is satisfied with the image after correction.

After completion of the first image, the user pushes a "next image display" button at a right upper portion of the GUI. The information of the representative color and the color correction parameters selected for each sample image is held. After completion of manual color correction for all of the sample images, all sets of the representative color and the color correction parameters designated by the user are delivered to the color correction parameter generating unit 27.

Supplied from the object color information memory 12 with the information of the split regions of the object, the color correction parameter generating unit 27 selects, for each split region, the representative color present in the region and the color correction parameters thereat among all sets of the representative color and the color correction parameters supplied from the manual color correction processing unit 25, calculates an average value of the color correction parameters, and describes the average value in the corresponding split region of the color correction parameter memory 14.

The representative color extracting unit 13 reads from the object color information memory 12 the distributable region of the hue of the selected object selected by the object selecting unit 11 and the distribution frequency in the split hue region to extract the representative color.

From the memory content of the color correction parameter memory 14, the color correction parameter determining unit 15 determines the optimum color correction parameters adapted to the representative color extracted by the representative color extracting unit 13. The color correction processing unit 16 carries out, upon the input image, color correction acting only upon the representative color of the object and the neighborhood colors therearound. As described above, the color correction apparatus 5 can carry out color correction upon the object in the input image in response to the taste of the user.

As described above, the color correction is automatically carried out for the specific object in the color image so that the color of the significant object, such as the skin color, the blue sky, and the green vegetation contained in the natural image can be automatically corrected into the favorable or the desired color without requiring masking operation or the dialog with the user. Furthermore, it is possible to provide the apparatus with the characteristic color reproducibility by incorporating the operation of this invention into the main body of the color image processing apparatus or the driver software.

As described above, according to this invention, the automatic color correction apparatus for carrying out color correction upon the specific object in the color image is controlled to perform the steps of extracting the representative color of the specific object from the given input image, assigning the color correction parameters to the split hue regions obtained by dividing the hue distributable region of the specific object, determining the optimum correction parameters adapted to the extracted representative color, and carrying out color correction conversion acting only upon the specific hue by the use of the optimum color correction parameters. In this manner, for each of the natural images picked up under the various lighting environments as the input image, excellent color correction can be realized without having the information as to the lighting environment of the input image and the sensor characteristics of the input sensor.

What is claimed is:

1. An automatic color correction apparatus for carrying out color correction upon a specific object in a color image, said apparatus comprising
an object color information memory for memorizing split hue regions obtained by splitting a hue distribution region of the specific object as well as a distribution frequency;
representative color extracting means for extracting a representative color of the specific object from a given input image with reference to the memory content of the object color information memory;
a color correction parameter memory for memorizing color correction parameters assigned to the split hue regions;
color correction parameter determining means for determining from the memory content of the color correction parameter memory an optimum color correction parameter adapted to the representative color extracted by the representative color extracting means, and
color correction processing means for carrying out color correction acting upon a specific color by the use of the optimum color correction parameter determined by the color correction parameter determining means.

2. An automatic color correction apparatus as claimed in claim 1, further comprising:
an extended object color information memory for memorizing split regions obtained by splitting a distribution range related to a hue, a saturation, or a brightness of the specific object or a combination thereof obtained by analyzing a plurality of images preliminarily picked up for the specific object under various image pickup environments as well as the distribution frequency;
said representative color extracting means
obtaining a histogram of the hue, the saturation, or the brightness of the specific object in the input image or the combination thereof with reference to the split regions related to the hue, the saturation, the brightness, or a combination thereof,
multiplying the distribution frequency memorized in said extended object color information memory by the histogram, and
extracting as the representative color of the specific object a color present in a region having a maximum value as a result of multiplication.

3. An automatic color correction apparatus as claimed in claim 1, wherein the representative color extracting means extracts the representative color of the specific object by the use of the variance of coordinate positions in the image in addition to the distribution frequency related to a hue, a saturation, or a brightness of the specific object or a combination thereof.

4. An automatic color correction apparatus as claimed in claim 1, wherein the color correction parameter memory memorizes the color correction parameters assigned not only to the split hue regions of the specific object but also to split saturation regions and split brightness regions obtained by splitting a saturation distribution region and a brightness distribution region of the specific object, respectively.

5. An automatic color correction apparatus as claimed in claim 1, further comprising
an input-dependent object color information memory for memorizing with respect to each individual input apparatus split regions obtained by splitting a distribution range related to a hue, a saturation, or a brightness of the specific object or a combination thereof as well as a distribution frequency,
an output-dependent color correction parameter memory for holding the color correction parameter with respect to each individual output apparatus, and
input/output apparatus selecting means supplied from the outside with the type of an input/output color image processing apparatus for reading corresponding information from said input-dependent object color information memory and said output-dependent color correction parameter memory.

6. An automatic color correction apparatus as claimed in claim 1, further comprising
a sample image memory for memorizing a plurality of kinds of sample color images of the specific object,
manual color correction processing means responsive to an external instruction for entering color information of said color images memorized in said sample image memory, and
color correction parameter generating means for generating the color correction parameters to be memorized in the color correction parameter memory with reference to the information supplied from the manual color correction processing means.

7. An automatic color correction method for carrying out color correction upon a specific object in a color image, said method comprising the steps of
extracting a representative color of the specific object from a given input image, determining, with reference to the content of a color correction parameter memory for memorizing color correction parameters assigned to split hue regions obtained by splitting a hue distribution region of the specific object, an optimum color correction parameter adapted to the representative color extracted in the preceding step, and carrying out color correction acting upon a specific color by the use of the optimum color correction parameter.

8. An automatic color correction method as claimed in claim 7, wherein the color correction parameter memory memorizes the color correction parameters assigned not only to the split hue regions of the specific object but also to split saturation regions and split brightness regions obtained by splitting a saturation distribution region and a brightness distribution region of the specific object, respectively.

9. An automatic color correction method as claimed in claim 7, wherein the step of extracting the representative color extracts the representative color of the specific object by the use of the variance of coordinate positions in the image in addition to the distribution frequency related to a hue, a saturation, or a brightness of the specific object, or a combination thereof.

10. A recording medium storing an automatic color correction control program for controlling an automatic color correction apparatus to carry out color correction upon a specific object in a color image, said automatic color correction control program controlling the automatic color correction apparatus to make the automatic color correction apparatus carry out operations of extracting from a given input image a representative color of the specific object, assigning color correction parameters to split hue regions obtained by splitting a hue distribution region of the specific object, determining an optimum color correction parameter adapted to the representative color extracted as mentioned above, and carrying out color correction acting upon a specific color by the use of the optimum color correction parameter.

11. A color correction apparatus for carrying out color correction upon a specific object in a color image, said apparatus comprising:

representative color extracting means for extracting a representative color of a specific object from a given input image;

color correction parameter determining means for determining an optimum color correction parameter for said representative color based on color correction parameters assigned to a range of color distribution of the said specific object may have; and color correction processing means for carrying out color correction acting upon color including said representative color of said specific object based on said optimum color correction parameter.

12. A color correction apparatus for carrying out color correction upon a specific object in a color image, said apparatus comprising:

representative color extracting means for extracting a representative color of a specific object from a given input image;

color correction parameter determining means for determining an optimum color correction parameter for said representative color based on color correction parameters assigned to a range of color distribution of the said specific object may have, and color correction processing means for carrying out color correction acting upon color including said representative color of said specific object based on said optimum color correction parameter.

13. A color correction method for carrying out color correction upon a specific object in a color image, said method comprising the steps of:

extracting a representative color of a specific object from a given input image;

determining an optimum color correction parameter for said representative color based on color correction parameters assigned to a range of distribution of the color that said specific object may have; and carrying out color correction acting upon color of said specific object based on said optimum color correction parameter.

14. A color correction method for carrying out color correction upon a specific object in a color image, said method comprising the steps of:

extracting a representative color of a specific object from a given input image;

determining an optimum color correction parameter for said representative color based on color correction parameters assigned to a range of distribution of the color that said specific object may have; and carrying out color correction acting upon color including said representative color of said specific object based on said optimum color correction parameter.

* * * * *